United States Patent [19]

Chitayat

[11] Patent Number: 4,749,921

[45] Date of Patent: Jun. 7, 1988

[54] LINEAR MOTOR WITH NON-MAGNETIC ARMATURE

[76] Inventor: Anwar Chitayat, Duck Island, P.O. Box 107, Northport, N.Y. 11768

[21] Appl. No.: 887,383

[22] Filed: Jul. 21, 1986

[51] Int. Cl.$^4$ ............................................. H02K 41/00
[52] U.S. Cl. ...................................... 318/135; 310/12
[58] Field of Search ........................ 310/12–14, 310/27, 67, 68 R, 152; 318/135, 254 A, 254 R

[56] References Cited

U.S. PATENT DOCUMENTS

| | | | |
|---|---|---|---|
| 3,913,045 | 10/1975 | Von Starck | 310/13 |
| 3,969,644 | 7/1976 | Nowak | 310/152 |
| 4,151,447 | 4/1979 | von der Heide | 318/135 |
| 4,303,017 | 12/1981 | Düll | 310/12 X |
| 4,369,383 | 1/1983 | Langley | 310/12 |
| 4,574,211 | 3/1986 | Müller et al. | 310/67 X |

FOREIGN PATENT DOCUMENTS 290354  6/1965  Netherlands .......................... 310/12

Primary Examiner—Donovan F. Duggan
Attorney, Agent, or Firm—Thomas R. Morrison

[57] ABSTRACT

An armature for a permanent-magnet linear motor is made up of a set of coils retained in a flat armature plate. The armature plate is of non-magnetic material. In one embodiment, the armature plate is of aluminum having parallel grooves machined in one surface to receive the straight runs of the coils. An aluminum plate covers the grooves to create a reinforcing box-like structure. In a second embodiment, the armature plate is dispensed with and the coils are integrally cast into a resin jacket. A further embodiment employs a serpentine cooling coil for supporting the coils prior to casting the resin and for dissipating coil heat during operation.

7 Claims, 4 Drawing Sheets

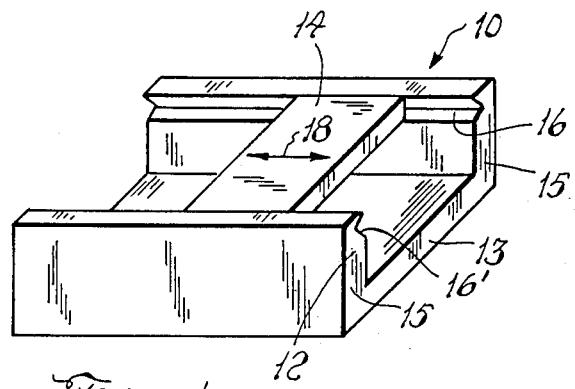
Fig. 1
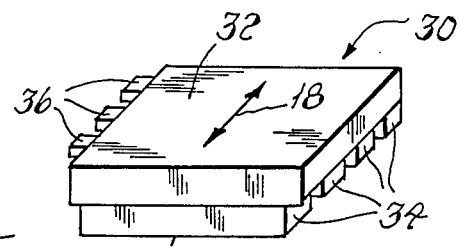
PRIOR ART
Fig. 2
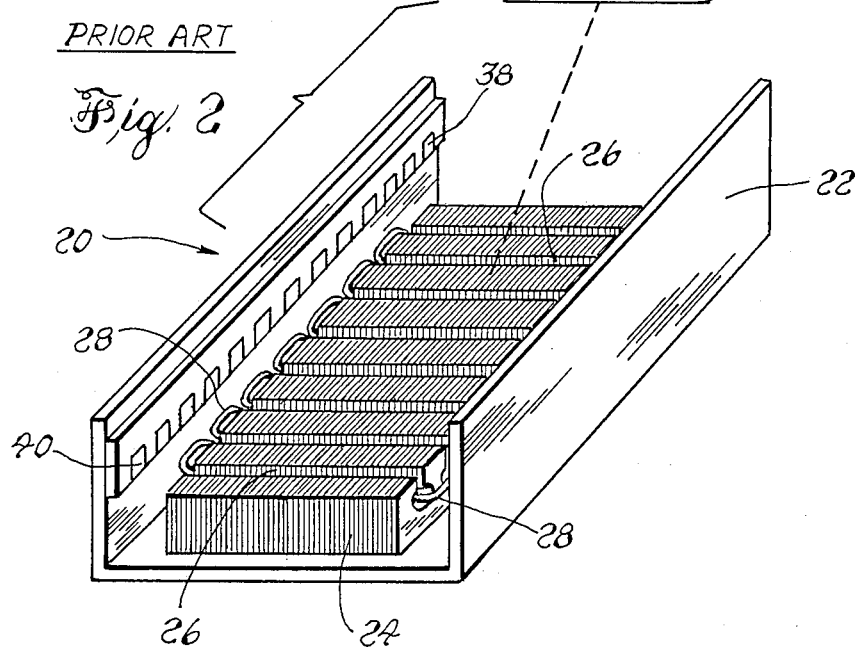

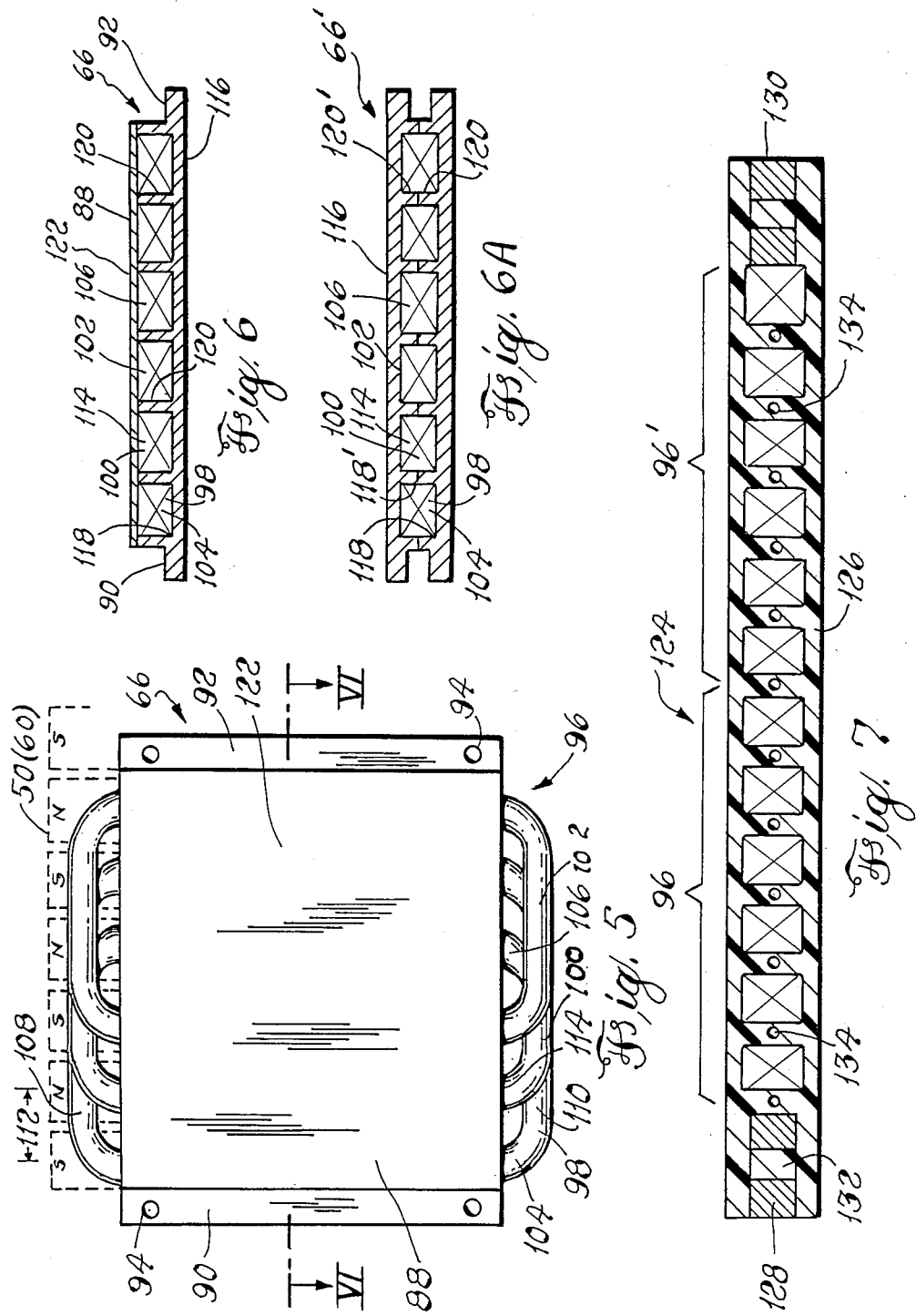

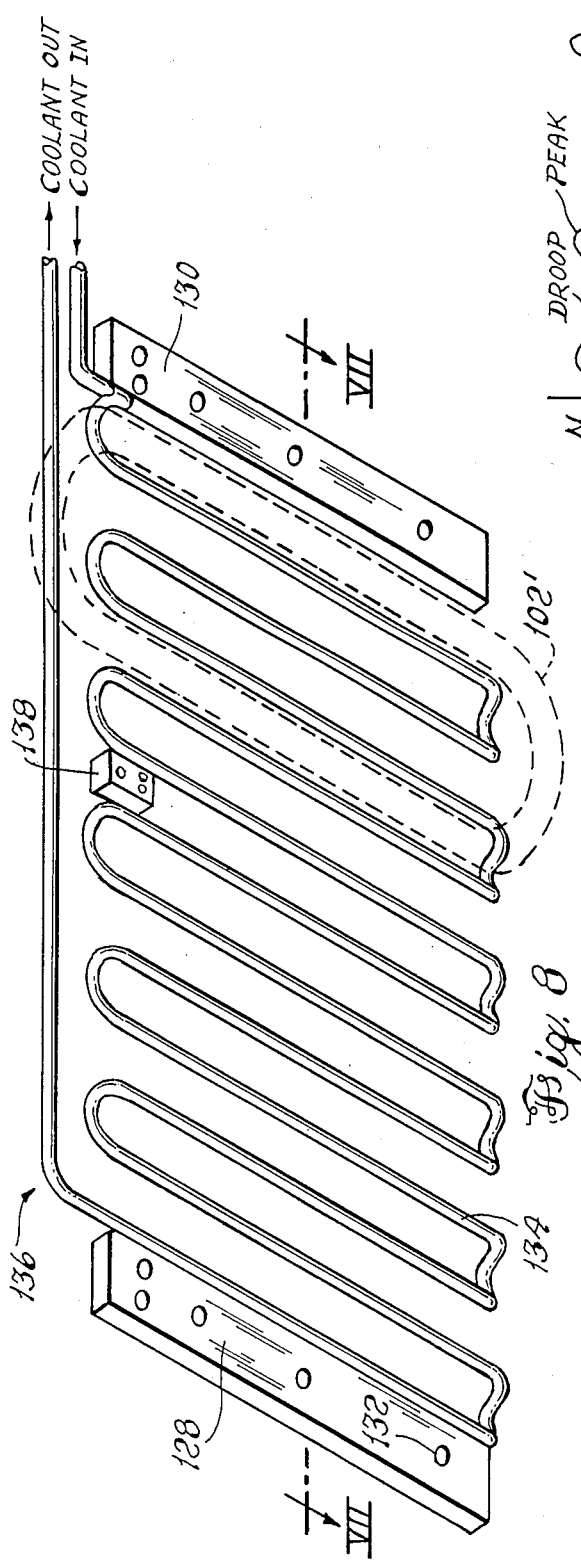
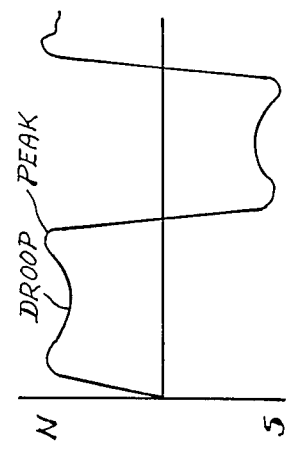
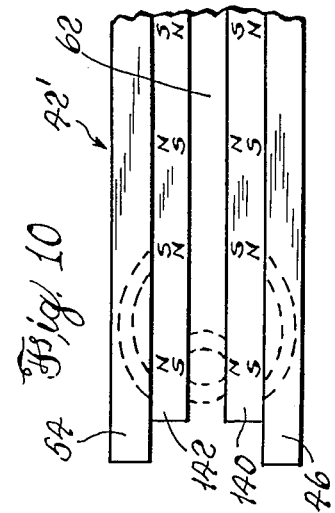
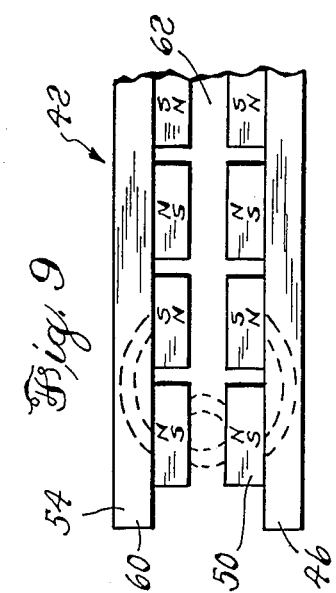
Fig. 8
Fig. 9
Fig. 10
Fig. 11

LINEAR MOTOR WITH NON-MAGNETIC ARMATURE

BACKGROUND OF THE INVENTION

The present invention relates to electromechanical devices and, more particularly, to linear motors of a type adapted for driving by a direct current source.

Numerous applications require the generation of a linear force. Conventional AC and DC motors produce a rotary torque about an axis which must be converted into a linear force before it can be used in such applications. Such conversion is accomplished by a screw and nut, a sheave and cable or a rack and pinion, among others. All prior art conversion techniques require an undesirable mass and a resulting backlash which interfere with high-precision, fast-response positioning.

Linear motors which directly produce a linear force in response to an electric input are known. One such linear motor, disclosed in U.S. Pat. No. 3,376,578, takes advantage of the variable magnetic reluctance produced in the vicinity of slots in a pole face of a magnetic member. An armature of magnetic material, having windings therein, is urged to step from position to position along the pole face as defined by the slots or, alternately, the magnetic member is movable while the armature is stationary. This solution has the disadvantage of a finite step size, which limits the accuracy with which the movable element can be positioned. In addition, the inherent slowness of a stepping action is contrary to the desire for high actuation speed.

An improved linear motor having DC excitation is disclosed in U.S. patent application Ser. No. 383,351 the disclosure of which is herein incorporated by reference, wherein a slotted armature contains windings excited by varying DC voltages in the slots thereof. The armature includes a planar surface facing pole pieces of permanent magnets. The permanent magnets are affixed to a movable member such as, for example, the table of a positioning table which retains the pole pieces close to, but spaced from, the planar surface of the armature, and constrains the motion of the table and the attached permanent magnets along a linear axis parallel to the face of the armature. The DC excitation provides rapid response and, with an appropriate control system, high positioning accuracy.

Linear DC motors of the type disclosed in the foregoing referenced patent incorporate the substantial mass of the permanent magnets on the movable member. This interferes with rapid acceleration. In addition, the magnetic attraction between the poles of the permanent magnets and the magnetic material of the armature (which may reach, for example, several hundred pounds), imposes a substantial static load which must be resisted by the device supporting the movable member. Such static load, in requiring a more massive supporting member, again increases the mass to be moved, as well as imposes increased loads on the bearing members of the movable member.

The above linear DC motors are especially useful when provided with a linear commutator which energizes only those armature windings within a magnetic influence of the permanent magnets. A set of brushes, preferably carbon brushes, is affixed to move with the movable member and contact linear stationary commutator segments. The commutator segments being contacted determine which armature windings are energized. The remainder of the armature windings stay deenergized until the brushes affixed to the movable member move into their vicinity. Since only some of the armature windings are energized at any time, and the windings energized change as the movable member travels along its linear axis, the total heat-generated resistance therein is reduced and such heat is distributed over a large mass and distance from which it is more easily dissipated.

Commutation is not favored in explosive environments or in environments which cannot tolerate particulate contamination such as, for example, in clean rooms. Thus, the benefit of commutation is less easily attainable in such environments.

Commutation in the linear motor of my referenced patent performs the dual functions of enabling the armature windings within the influence of the magnets on the movable member and also feeding power to the enabled windings. The amplitude and polarity of the power fed to the selected windings is determined by a conventional control system. Other means for enabling and feeding power to windings exist without the need for commutation. For example, electro-optical, magnetic, Hall-effect and other techniques may be employed to determine the location of the movable member with sufficient accuracy to select the particular windings to be enabled. Such enabled windings may then be energized using, for example, electronic or electromechanical switches.

OBJECTS AND SUMMARY OF THE INVENTION

Accordingly, it is an object of the invention to provide a linear DC motor which overcomes the drawbacks of the prior art.

It is a further object of the invention to provide a permanent magnet DC linear motor in which an armature is formed without magnetic material therein.

It is a still further object of the invention to provide a DC linear motor having a planar armature movable between opposed sets of permanent magnets.

It is a still further object of the invention to provide a DC linear motor in which a frame for armature windings thereof includes a serpentine coolant structure.

It is a still further object of the invention to provide an armature for a DC linear motor in which windings are disposed in slots in a non-magnetic plate and the slots are closed by a plate bonded thereto, thus forming a reinforced structure.

It is a still further object of the invention to provide a permanent magnet DC linear motor adapted for use in an environment where sparks and atmospheric contaminants are not acceptable.

It is a still further object of the invention to provide a permanent magnet DC linear motor having first and second rows of opposed magnets facing each other across a slot. Each magnet in each row is of opposite magnetic polarity both to all its neighboring magnetics and to the magnetic which it opposes across the slot.

It is a still further object of the invention to provide a permanent magnet linear motor in which the permanent magnets consist of a plurality of magnetic zones of alternating polarity in a single magnetic material.

It is a still further object of the invention to provide a permanent magnet DC linear motor in which the field strengths of the permanent magnetic zones are shaped to control a characteristic of the linear motor variably along its axis of motion.

Briefly stated, the present invention provides an armature for a permanent magnet linear motor made up of a set of coils retained in a flat armature plate. The armature plate is comprised of non-magnetic material. In one embodiment, the armature plate is comprised of aluminum having parallel grooves machined in one surface thereof to receive the straight runs of the coils. An aluminum plate covers the grooves to create a reinforcing box-like structure. In another embodiment, the armature plate is omitted and the coils are integrally cast into a resin jacket. A further embodiment employs a serpentine cooling coil for supporting the coils prior to casting the resin, and for dissipating coil heat during operation.

According to an embodiment of the invention, there is provided a permanent magnet linear motor comprising at least one magnet plate, at least one magnetic member affixed to the at least one magnet plate, the at least one magnetic member having a plurality of magnetic zones, each of the plurality of magnetic zones including a first magnetic pole facing outward from the at least one magnet plate and a second magnetic pole facing the at least one magnet plate, the first magnetic poles alternating in magnetic polarity between adjacent ones of the magnetic zones, an armature plate, retaining means for retaining the armature plate adjacent the at least one magnetic member, the armature plate containing at least one coil having a plurality of turns of a conductor, securing means in the armature plate for securing the at least one coil disposed for interaction with the first magnetic poles of the magnetic member, whereby a force may be generated by a current in the conductor, and the armature plate containing substantially no magnetic material, whereby a static load of magnetic attraction between the at least one magnetic member and the armature plate is avoided.

According to a feature of the invention, there is provided an armature plate for a linear motor comprising a serpentine coolant tube, the serpentine coolant tube having a shape effective for permitting the preassembly of a plurality of windings therein, a curable plastic resin surrounding a substantial portion of the coolant tube and the plurality of windings, and the curable plastic resin being effective, when cured, for securing the armature plate into a rigid assembly.

According to a further feature of the invention, there is provided a magnetic member for a linear motor comprising at least first and second magnetic zones of alternating magnetic polarity formed in the magnetic member, the first and second magnetic zones having a non-linearity in magnetic strength in a direction of motion of the linear motor, whereby a force produced by the linear motor is changed.

The above, and other objects, features and advantages of the present invention will become apparent from the following description read in conjunction with the accompanying drawings, in which like reference numerals designate the same elements.

BRIEF DESCRIPTION OF THE DRAWINGS

FIG. 1 is a simplified view of a positioning table which may provide an environment for the linear motor of the present invention.

FIG. 2 is a perspective view of a linear motor according to the prior art with the movable member thereof displaced from its normal position to reveal the linear armature.

FIG. 5 is a side view of an armature plate of the linear motor of FIGS. 3 and 4.

FIG. 6 is a cross section taken along VI—VI in FIG. 5.

FIG. 6A is a cross section of a second embodiment of an armature plate taken along VI—VI in FIG. 5.

FIG. 7 is a cross section of a cooled armature plate in a cast resin jacket.

FIG. 8 is an armature frame formed of a serpentine coolant tube.

FIG. 9 is an end view of the linear motor of FIGS. 3 and 4 showing the placement and magnetic polarities of permanent magnets therein.

FIG. 10 is a view corresponding to FIG. 9 in which the individual permanent magnets in each set of magnets are replaced with a single ceramic magnet member which is magnetized in zones.

FIG. 11 is a curve showing one possible magnetized pattern for the ceramic magnet member of FIG. 10.

DETAILED DESCRIPTION OF THE PREFERRED EMBODIMENT

Figure 3:
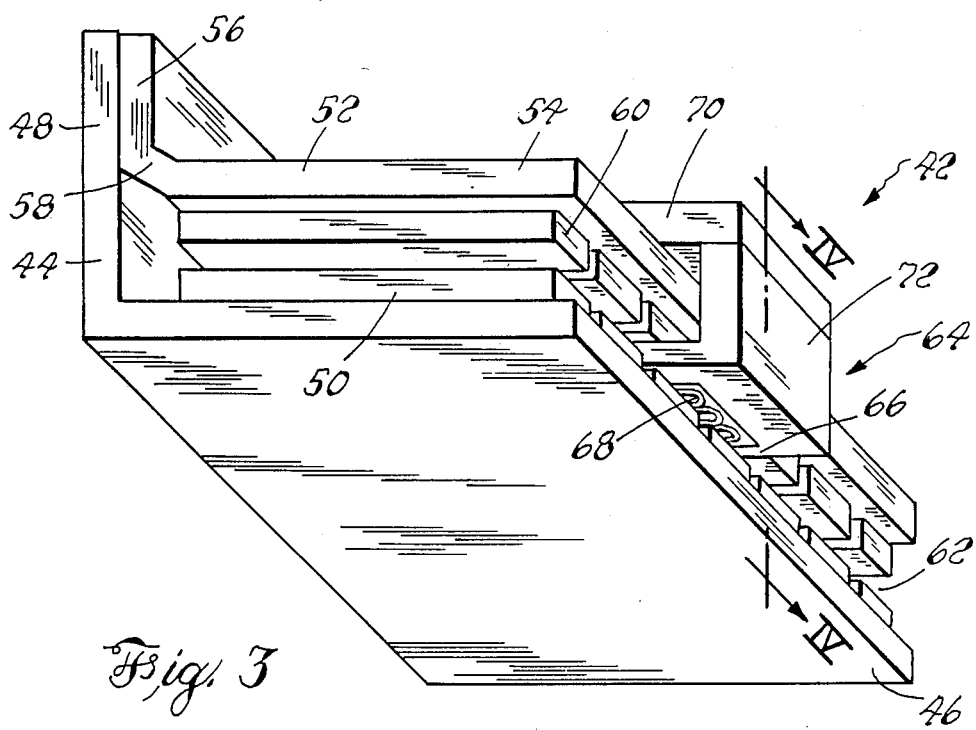
FIG. 3 is a bottom perspective view of a linear motor according to an embodiment of the invention.

Referring to FIG. 1, a positioning table 10 is shown as an exemplary environment in which the present invention may be employed. This environment should not be considered as a limitation thereof.

Positioning table 10 includes a frame 12 having a base 13 and first and second upward-directed arms 15, each having a groove 16 therein. A table 14 includes suitable conventional guidance means (not shown) in the edges thereof to engage grooves 16 for constraining table 14 to move along a linear axis as indicated by a double-headed arrow 18.

In the prior art, table 14 is driven in the direction indicated using, for example, a screw (not shown) affixed to frame 12 with its axis parallel to double-headed arrow 18 and a nut (not shown) affixed to table 14 and engaging the screw. Rotation of the screw is effective for moving table 14 with respect to frame 12. Screw drive suffers from inaccuracy due to windup, slow response due to the large mass which must be rotated, and to the inherent limitations of rotary motors.

A further type of drive, such as that disclosed in the referenced patent, employs a linear motor and, more preferably, a permanent-magnet DC linear motor.

Referring now to FIG. 2, a permanent-magnet DC linear motor 20 is shown. A U-shaped motor frame 22 is normally affixed to base 13 inside frame 12 (FIG. 1). A linear armature 24 includes a plurality of slots 26 into which a plurality of windings 28 are laid. A movable member 30 includes a plate 32 which is normally affixed to the underside of table 14 (FIG. 1) and is movable therewith. A plurality of permanent magnets 34 are affixed to the underside of plate 32 and, when supported by table 14, are maintained close to, but not touching, a surface of linear armature 24. A plurality of brushes 36 are spring loaded transversely from plate 32. A linear commutator assembly 38, having a plurality of commutator pads 40 on a surface thereof, is disposed on a vertical inner surface of U-shaped motor frame 22 where appropriate ones of commutator pads 40 are contacted by brushes 36 as movable member 30 travels along the linear axis indicated by double-headed arrow 18. Power is fed to brushes 36 by any convenient means such as, for example, pendant cable (not shown), or by linear slip rings (see referenced patent) preferably integrated into the surface of linear commutator assembly 38 and for which additional power pickup brushes (not shown) are included on plate 32. Appropriate DC drive signals are connected through the power feed devices to energize those windings 28 which are within the influence of brushes 36, and which are, therefore, within the influence of permanent magnets 34.

According to techniques well known in the art, linear armature 24 is made of magnetic material such as, for example, thin lamina of silicon steel, to which permanent magnets 34 are strongly attracted. The strong static attraction between permanent magnets 34 and the facing surface of linear armature 24 which may amount to, for example, several hundred pounds, places a heavy burden on the guidance means (not shown) supporting table 14 (FIG. 1) and movable member 30 attached thereto. In addition, the magnetic reluctance of linear armature 24 increases the response time for changing the polarities and magnitudes of currents in windings 28, and thus limits the speed with which movable member 30 can respond to drive signals.

Referring now to FIG. 3, a bottom perspective view is shown of a linear motor 42 according to an embodiment of the invention. A right-angled lower magnet mount 44 includes a lower plate 46 which may be mounted on base 13 of frame 12 (FIG. 1), and a side plate 48 at right angles to lower plate 46. A first plurality of magnets 50 is affixed to an upper surface of lower plate 46.

An upper magnet mount 52 is disposed with an upper plate 54 spaced from, and parallel to, lower plate 46. A side plate 56 of upper magnet mount 52 is affixed parallel to side plate 48 for supporting upper plate 54 in the required position. An angled portion 58 joins upper plate 54 and side plate 56 for reasons which will become apparent hereinafter. A second plurality of magnets 60 are disposed on an inner surface of upper plate 54 facing magnets 50. Magnets 50 and magnets 60 are spaced apart a predetermined distance, whereby a slot 62 is formed therebetween.

Figure 4:
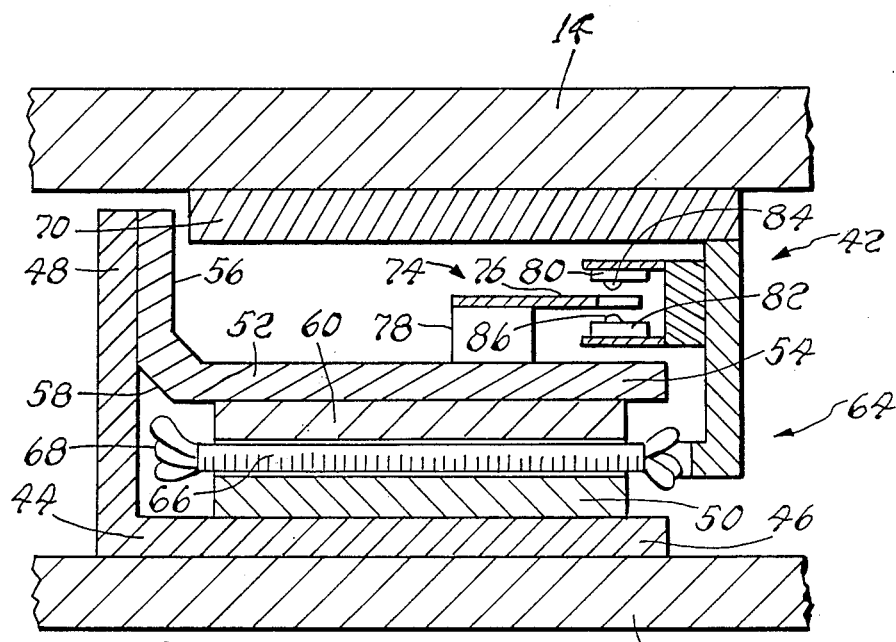
FIG. 4 is a cross section taken along IV—IV in FIG. 3 indicating the locations of a table frame and a table.

Referring now also to FIG. 4, an armature assembly, shown generally at 64, includes an armature plate 66 having a plurality of windings 68 disposed therein. An upper plate 70 is affixed to a lower surface of table 14 for concerted movement of armature assembly 64, therewith. A side plate 72 connects armature plate 66 to upper plate 70. At least armature plate 66, and preferably all of armature assembly 64, contains no magnetic material. As a consequence, the presence of armature plate 66 between magnets 50 and 60 imposes no static load on table 14, as is the case with the apparatus of the prior art. In addition, since they bear no static load, the cross sections of side plate 72 and upper plate 70 can be made smaller and of lighter material such as, for example, aluminum. Also, since armature assembly 64 does not require magnetic material, it can be made of lighter material than is possible with the apparatus of the prior art. For example, armature plate 66 may be made principally of aluminum or a cured plastic resin.

A commutation sensor 74 includes a commutation blade 76 mounted on upper magnet mount 52 by a plurality of mounting blocks 78. Commutation blade 76 is disposed between a light source assembly 80 and a light sensing assembly 82. Light source assembly 80 includes a plurality, of light-emitting diodes 84 spaced apart along the axis of motion of table 14. Light sensing assembly 82 includes a plurality of photocells 86, each disposed facing one of light-emitting diodes 84. Commutation sensor 74 produces output signals which inform a control system of the phase space occupied by armature assembly 64 at any time, and thus enable the generation of appropriately phased control signals for driving armature assembly 64. In effect, commutation sensor 74 acts as a sensor for apparatus which performs the enablement and/or coil-selection function of the commutator of the prior art.

Although linear motor 42 may have any desired number of phases greater than one, a three-phase system is selected for convenience of description.

Referring now to FIG. 5, armature plate 66 includes a plate 88 having attachment flanges 90 and 92 at opposed edges thereof. Attachment flanges 90 and 92 include suitable means for attachment to side plate 72 (FIG. 3) such as, for example, a plurality of mounting holes 94. In a three-phase linear motor system, a group of three coils forms a coil set such as a coil set 96 shown in armature plate 66. Coil set 96 consists of a phase A coil 98, a phase B coil 100 and a phase C coil 102. Phase A coil 98, which is representative of the three coils in coil set 96, includes a large number of turns of insulated wire shaped to form an upward run 104, in which positive current flows upward, and a downward run 106, in which positive current flows downward. Upward run 104 and downward run 106 are joined by an upper end turn 108 and a lower end turn 110 to form a complete multi-turn winding.

The center-to-center spacing between corresponding runs of adjacent coils in coil set 96 is called the pitch of the coils and is identified by a reference numeral 112. That is, for example, the pitch of the coils is equal to the center-to-center spacing between upward run 104 of phase A coil 98 and an upward run 114 of phase B coil 100. It should also be noted that pitch 112 also defines the center-to-center spacing between adjacent magnets 50 or 60.

Referring now to FIG. 6, armature plate 66 is formed of a non-magnetic plate 116, preferably of aluminum. A parallel set of six grooves 118 are formed in non-magnetic plate 116 to receive upward run 104 and downward run 106 of phase A coil 98 as well as corresponding elements of phase B coil 100 and phase C coil 102. Adjacent grooves 118 are separated by flanges 120.

Each upward and downward run of phase A coil 98 is preferably shaped to fit its groove 118 and is impregnated with a settable resin before being assembled into non-magnetic plate 116. In order to permit maximum discharge of heat from the coils to non-magnetic plate 116, the settable resin is preferably of a type having superior thermal conductivity. One such settable resin is an epoxy resin sold by Emerson and Cuming, Inc. of Canton Mass. under the trademark Stycast 2850MT which has a thermal conductivity of 20 BTU-/in./(hr)(ft2)(degree F.). Such thermal conductivity is about twice the value of conventional epoxy resins.

A cover plate 122, preferably of aluminum, is bonded to the extremities of all flanges 120. Besides protecting the wire in armature plate 66 from abrasion, cover plate 122 stiffens the structure of non-magnetic plate 116 in a manner similar to the stiffening obtained in a honeycomb structure. That is, each groove 118 becomes part of a box covered by the portion of cover plate 122 bonded to its defining flanges 120. As is well known, such a box structure substantially improves stiffness and thus permits thinner sections to be employed in non-magnetic plate 116 and cover plate 122. Such thin sections enhance the desirable lightness of weight of armature plate 66, which permits more rapid response of the assembled machine.

One skilled in the art would immediately recognize that armature plate 66 is not limited to a single coil set. Instead, more force may be attainable within acceptable temperature limits by extending the length of non-magnetic plate 116 to provide space for one or more additional coil sets.

Referring now to FIG. 6A, an armature plate 66' is shown similar to armature plate 66 of FIG. 6, except that cover plate 122 is replaced by a second non-magnetic plate 116' having grooves 118' formed therein, matching grooves 118 in non-magnetic plate 116. The abutting ends of flanges 120 and flanges 120' are affixed together, whereby a reinforcing box-like structure is formed.

In a further embodiment of the invention, the metallic structure consisting of non-magnetic plate 116 and cover plate 122 (or non-magnetic plate 116') may be replaced by a cast resin structure effective for holding coil set 96 in position, and for permitting attachment to external elements. Although resin materials typically are less stiff and have thermal conductivities inferior to those of metals, their strengths may be sufficient since no static load must be borne and any limitation on maximum force created by the increased difficulty in discharging the heat may be acceptable.

Referring now to FIG. 7, there is shown a cast armature plate 124 having coil sets 96 and 96' in a cast resin jacket 126. Cast resin jacket 126 is preferably of a high thermal conductivity resin such as, for example, the previously mentioned epoxy resin. Metallic attachment flanges 128 and 130 are preferably integrally cast in cast resin jacket 126 to improve the sturdiness of attachment of armature plate 124 to external elements. Metallic attachment flanges 128 and 130 are preferably of non-magnetic material and most preferably of a light metallic material such as, for example, aluminum. Metallic attachment flanges 128 and 130 may include one or more bonding holes 132 therein into which resin is permitted to flow during the formation of cast resin jacket 126, whereby an improved mechanical bond is formed therebetween. A plurality of coolant tubes 134 are embedded in cast resin jacket 126 for dissipating heat from coil sets 96 and 96'.

Referring now also to FIG. 8, an armature frame 136 is formed by coolant tube 134 bent into a serpentine shape in which coils such as, for example, phase C coil 102' indicated in dashed line, are supported temporarily until finally secured in position by the casting of resin about them and the curing thereof. Metallic attachment flanges 128 and 130, as well as an optional center attachment flange 138, are preassembled into armature frame 136 by cementing them to adjacent portions of coolant tube 134. It will be noted that the supporting structure consisting of a non-magnetic plate 116 and a cover plate 122 (FIGS. 5 and 6) have been completely replaced by the serpentine coolant tube 134 which performs the double duty of a preliminary positioning and holding device during manufacture and a cooling device during use.

It will be clear to one skilled the art that any convenient coolant may be circulated through coolant tube 134. For example, water, a suitable organic fluid or a refrigerant may be employed depending on the environment. The coolant may flow in an open or closed system. An open system may pass water from a supply to a drain for single-pass cooling. A closed system may pass the coolant discharged from coolant tube 134 through a heat exchanger or a mechanical refrigeration device, wherein heat is removed before returning it to coolant tube 134. Due to their intimate contact with the coils aided by the heat-conductive nature of the resin cast around it, such coolant tube is very effective in extracting heat from armature plate 124.

Referring now to FIG. 9, an end view of linear motor 42 is shown with the magnetic polarities of magnets 50 and 60 indicated. Magnets 50 and 60 are magnetized with their magnetic poles on their broad faces which lie adjacent to slot 62. The magnetic polarities along magnets 50 alternate, whereby each magnet 50 having a north magnetic pole facing slot 62 is flanked by one or two magnets 50 having a south magnetic pole facing slot 62. In this way, the magnetic paths between adjacent magnets 50 are closed through lower plate 46, which is preferably of magnetic material such as, for example, steel. A similar arrangement of magnets 60 on upper plate 54 provides efficient paths for closing their magnetic fields. Each magnet 60 faces a magnetic 50 of opposite polarity across slot 62.

Referring now to FIG. 10, an embodiment of the invention is shown in which magnets 50 of the prior embodiments are replaced by a single magnet strip 140 having individual magnetic zones corresponding to the north and south polarities of the prior embodiments. Similarly, magnets 60 are replaced by a single magnet strip 142 also having corresponding magnetic zones therein.

One skilled in the art knows that permanent magnet DC linear motors are subject to periodic reductions in generated force, called cogging, as the windings pass between magnets or magnetic zones. The magnetic zones of magnet strips 140 and 142 can be shaped to reduce cogging, or for other purposes.

Referring now to FIG. 11, the magnetic field strength of magnet strip 140 or 142 may be shaped with a central droop in each zone, with peaks at the ends of each zone. In this way, the tendency for the generated force to fall off is reduced as the interface between adjacent magnetic zones is traversed.

Other shapes of the magnetic field strengths of magnetic zones may be employed for purposes other than for the reduction of cogging. For example, a linear motor may be required to produce more force in one part of its operational range than in other parts. Accordingly, a greater magnetic field may be employed in the high-force part of the range than in other parts thereof. Shaping of magnetic zones may advantageously be employed at the ends of magnet strips 140 and 142 to counteract the reduction in generated force due to end-effect fringing.

Although a symmetrical device having two opposed rows of magnets is the preferred embodiment, other numbers of rows of magnets should be considered to lie within the scope of the invention. For example, an embodiment having a single row of magnets facing a side of an armature plate should be considered within the scope of the invention. In addition, an embodiment of the invention in which two additional rows of magnets are disposed back to back on a center magnet plate disposed in slot 62 may be employed with a parallel pair of armature plates in the two slots thus formed. Such an arrangement effectively doubles the generated force for a given armature current.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A permanent magnet linear motor comprising:
at least one magnet plate;
at least one magnetic member affixed to said at least one magnet plate;
said at least one magnetic member having a plurality of magnetic zones, each of said plurality of magnetic zones including a first magnetic pole facing outward from said at least one magnet plate and a second magnetic pole facing said at least one magnet plate;
said first magnetic poles in alternating magnetic polarity between adjacent ones of said magnetic zones;
an armature plate;
retaining means for retaining said armature plate adjacent said at least one magnetic member;
said armature plate containing at least one coil having a plurality of turns of a conductor;
securing means in said armature plate for securing said at least one coil disposed for interaction with said first magnetic poles of said at least one magnetic member, whereby a force may be generated by a current in said conductor;
said armature plate containing substantially no magnetic material, whereby a static load of magnetic attraction between said at least one magnetic member and said armature plate is avoided.
said securing means includes at least first and second grooves in said armature plate;
said at least one coil includes first and second substantially straight runs;
said first and second substantially straight runs are disposed in said first and second grooves;
said armature plate includes at least first and second flanges extending away from said armature plate alongside said at least first and second grooves; and
a plate affixed to said at least first and second flanges substantially covers said at least first and second grooves, and said first and second substantially straight runs therein.

2. A permanent magnet linear motor comprising:
at least one magnet plate;
at least one magnetic member affixed to said at least one magnet plate;
said at least one magnetic member having a plurality of magnetic zones, each of said plurality of magnetic zones including a first magnetic pole facing outward from said at least one magnet plate and a second magnetic pole facing said at least one magnet plate;
said first magnetic poles in alternating magnetic polarity between adjacent ones of said magnetic zones;
an armature plate;
retaining means for retaining said armature plate adjacent said at least one magnetic member;
said armature plate containing at least one coil having a plurality of turns of a conductor;
securing means in said armature plate for securing said at least one coil disposed for interaction with said first magnetic poles of said at least one magnetic member, whereby a force may be generated by a current in said conductor;
said armature plate containing substantially no magnetic material, whereby a static load of magnetic attraction between said at least one magnetic member and said armature plate is avoided.
said securing means includes at least first and second grooves in said armature plate;
said at least one coil includes first and second substantially straight runs;
said first and second substantially straight runs are disposed in said first and second grooves;
said armature plate includes at least first and second flanges extending away from said armature plate alongside said at least first and second grooves;
said armature plate further includes a second plate having third and fourth grooves therein with at least third and fourth flanges extending away from said second plate alongside said at least third and fourth grooves;
said at least third and fourth flanges being affixed to said at least first and second flanges;
said first groove being aligned with said third groove and having said first run therein and
said second groove being aligned with said fourth groove and having said second run therein.

3. A permanent magnet linear motor comprising:
at least one magnet plate;
at least one magnetic member affixed to said at least one magnet plate;
said at least one magnetic member having a plurality of magnetic zones, each of said plurality of magnetic zones including a first magnetic pole facing outward from said at least one magnet plate and a second magnetic pole facing said at least one magnet plate;
said first magnetic poles in alternating magnetic polarity between adjacent ones of said magnetic zones;
an armature plate;
retaining means for retaining said armature plate adjacent said at least one magnetic member;
said armature plate containing at least one coil having a plurality of turns of a conductor;
securing means in said armature plate for securing said at least one coil disposed for interaction with said first magnetic poles of said at least one magnetic member, whereby a force may be generated by a current in said conductor;
said armature plate containing substantially no magnetic material, whereby a static load of magnetic attraction between said at least one magnetic member and said armature plate is avoided;
said armature plate is a cured plastic resin formed about said at least one coil; and
said armature plate includes coolant coils integrally formed therein.

4. A permanent magnet linear motor comprising:
at least one magnet plate;
at least one magnetic member affixed to said at least one magnet plate;
said at least one magnetic member having a plurality of magnetic zones, each of said plurality of magnetic zones including a first magnetic pole facing outward from said at least one magnet plate and a second magnetic pole facing said at least one magnet plate;

said first magnetic poles in alternating magnetic polarity between adjacent ones of said magnetic zones;

an armature plate;

retaining means for retaining said armature plate adjacent said at least one magnetic member;

said armature plate containing at least one coil having a pluality of turns of a conductor;

securing means in said armature plate for securing said at least one coil disposed for interaction with said first magnetic poles of said at least one magnetic member, whereby a force may be generated by a current in said conductor;

said armature plate containing substantially no magnetic material, whereby a static load of magnetic attraction between said at least one magnetic member and said armature plate is avoided; and said armature plate includes coolant coils integrally formed therein.

5. An armature plate for a linear motor comprising:

a serpentine coolant tube;

said serpentine coolant tube having a shape effective for permitting the preassembly of a plurality of windings therein;

a curable plastic resin effective for surrounding a substantial portion of said serpentine coolant tube and said plurality of windings; and said curable plastic resin being effective, when cured, for securing said armature plate into a rigid assembly.

6. An armature plate according to claim 5 wherein said curable plastic resin is formed about said coolant tube and said plurality of windings, and is cured.

7. An armature plate according to claim 5 wherein said serpentine coolant tube includes at least one attachment flange affixed thereto.

* * * * *